US012732901B2

(12) United States Patent
Paladugu et al.

(10) Patent No.: US 12,732,901 B2
(45) Date of Patent: Sep. 8, 2026

(54) INTERWORKING FUNCTION SELECTION BY REMOTE UE

(71) Applicant: QUALCOMM Incorporated, San Diego, CA (US)

(72) Inventors: Karthika Paladugu, San Diego, CA (US); Hong Cheng, Basking Ridge, NJ (US); Haris Zisimopoulos, London (GB); Stefano Faccin, San Ysidro, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 727 days.

(21) Appl. No.: 17/757,276

(22) PCT Filed: Dec. 22, 2020

(86) PCT No.: PCT/US2020/066638

§ 371 (c)(1),
(2) Date: Jun. 13, 2022

(87) PCT Pub. No.: WO2021/138155

PCT Pub. Date: Jul. 8, 2021

(65) Prior Publication Data

US 2025/0184879 A1 Jun. 5, 2025

(30) Foreign Application Priority Data

Jan. 3, 2020 (GR) .............................. 20200100003

(51) Int. Cl.
*H04W 48/18* (2009.01)
*H04W 8/00* (2009.01)
(Continued)

(52) U.S. Cl.
CPC ........... *H04W 48/18* (2013.01); *H04W 8/005* (2013.01); *H04W 88/04* (2013.01); *H04W 92/02* (2013.01); *H04W 92/18* (2013.01)

(58) Field of Classification Search
CPC ....... H04W 48/00; H04W 48/18; H04W 8/00; H04W 8/005; H04W 88/00; H04W 88/02;
(Continued)

(56) References Cited

U.S. PATENT DOCUMENTS 5,917,816 A * 6/1999 Jacobsohn .......... H04W 88/181 370/352
6,393,482 B1 * 5/2002 Rai ....................... H04W 12/02 709/225
(Continued)

FOREIGN PATENT DOCUMENTS

CN 109997334 A 7/2019
EP 2109270 A1 * 10/2009 ........... H04L 51/066
(Continued)

OTHER PUBLICATIONS

International Search Report and Written Opinion—PCT/US2020/066638—ISA/EPO—Apr. 20, 2021.
(Continued)

*Primary Examiner* — Warner Wong
(74) *Attorney, Agent, or Firm* — QUALCOMM Incorporated

(57) ABSTRACT

Certain aspects of the present disclosure provide techniques for interworking function selection by a remote user equipment (UE) for UE-to-network sidelink relay access. A method that may be performed by a remote user equipment (UE) includes receiving a plurality of interworking function configurations, for accessing a network via a sidelink relay UE, and a plurality of relay service codes. The remote UE determines a service to use for communications in the
(Continued)

network. The remote UE selects one of the plurality of interworking function configurations based on the relay service code for the determined service.

18 Claims, 12 Drawing Sheets

(51) Int. Cl.
*H04W 88/04* (2009.01)
*H04W 92/02* (2009.01)
*H04W 92/18* (2009.01)

(58) Field of Classification Search
CPC ..... H04W 88/04; H04W 92/00; H04W 92/02; H04W 92/16; H04W 92/18
See application file for complete search history.

(56) References Cited

U.S. PATENT DOCUMENTS

2010/0185740 A1* 7/2010 Lee ..................... H04L 67/63 709/206
2012/0084668 A1* 4/2012 Rohnert .................. H04L 51/18 715/752
2013/0332554 A1* 12/2013 Lee ..................... H04L 65/1101 709/206
2015/0029866 A1* 1/2015 Liao ..................... H04W 48/14 370/254
2018/0098370 A1 4/2018 Bangolae et al.
2018/0199262 A1* 7/2018 Kuge .................... H04W 48/04
2018/0227978 A1* 8/2018 Keller ................. H04L 65/4015
2018/0279110 A1 9/2018 Sen et al.
2019/0313234 A1 10/2019 Liu
2020/0053802 A1* 2/2020 Li ......................... H04W 12/06
2022/0337993 A1* 10/2022 Landais ................ H04W 8/186
2022/0369219 A1* 11/2022 Landais ................ H04L 5/0046
2024/0129722 A1* 4/2024 Foti ....................... H04W 88/16

FOREIGN PATENT DOCUMENTS

EP 3316605 A1 5/2018
WO WO-2009089751 A1 * 7/2009 ...... H04W 36/00226

OTHER PUBLICATIONS

Qualcomm Incorporated, et al., “KI#3, Sol#23: Update N3IWF Selection for Layer-3 UE-to-Network Relay”, SA WG2 Meeting #140E (e-meeting), S2-2008282, 3rd Generation Partnership Project, Mobile Competence Centre; 650, Route Des Lucioles; F-06921 Sophia-Antipolis Cedex; France, vol. SA WG2, No. E (e-meeting), Elbonia, Aug. 19, 2020-Sep. 1, 2020, Oct. 25, 2020, 9 Pages, XP051948347.

Interdigital Inc.: “Solution for KI #3: Support of UE-to-Network Relay”, SA WG2 Meeting #136, S2-1911798 (Revision of S2-18xxxx), 3rd Generation Partnership Project (3GPP), Mobile Competence Centre, 650, Route Des Lucioles, F-06921 Sophia-Antipolis Cedex, France, vol. SA WG2, No. Reno, US, Nov. 18, 2019-Nov. 22, 2019, pp. 1-5, Nov. 8, 2019, XP051821873.

* cited by examiner

300

One Radio Frame
10 ms

Radio Frame t - 1
Radio Frame t
Radio Frame t + 1
Time

Subframe
1 ms

Subframe 0
Subframe 1
Subframe 2
Subframe 3
Subframe 4
Subframe 5
Subframe 6
Subframe 7
Subframe 8
Subframe 9

Subframe = {1, 2, 4...} Slots
depends on subcarrier spacing

Slot 0
Slot 1
Slot 2
Slot 3

Slot = {7, 12, 14} Symbols
depends on subcarrier spacing

PSS
PBCH
SSS
PBCH 0 1 2 3 4 5 6 7 8 9 10 11 12 13

SS Block

805

CONFIGURE, BY A NETWORK ENTITY, ONE OR MORE USER EQUIPMENTS (UE) AS REMOTE UES AND ONE OR MORE UES AS SIDELINK RELAY UES

810

PROVIDE, BY THE NETWORK ENTITY, THE ONE OR MORE REMOTE UES AND ONE OR MORE SIDELINK RELAY UES WITH ONE OR MORE INTERWORKING FUNCTION CONFIGURATIONS, FOR ACCESS BY THE ONE OR MORE REMOTE UES TO A NETWORK VIA THE ONE OR MORE SIDELINK RELAY UES, AND A PLURALITY OF RELAY SERVICE CODE

815

RECEIVE, BY THE NETWORK ENTITY, DATA FROM AT LEAST ONE OF THE ONE OR MORE REMOTE UE VIA AT LEAST ONE OF THE ONE OR MORE SIDELINK RELAY UES AND AT LEAST ONE INTERWORKING FUNCTION ASSOCIATED WITH ONE OF THE ONE OR MORE INTERWORKING FUNCTION CONFIGURATIONS

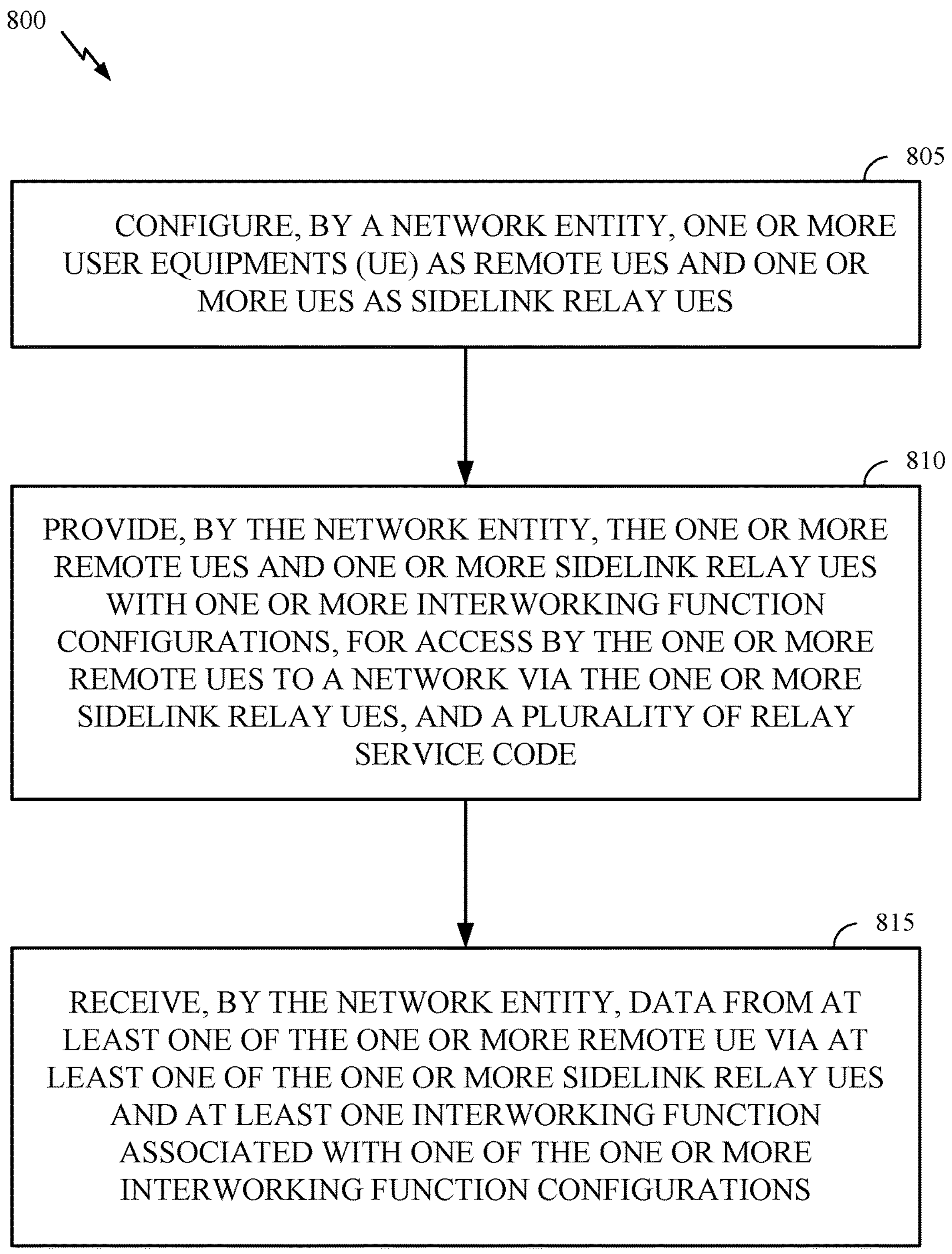

FIG. 8

INTERWORKING FUNCTION SELECTION BY REMOTE UE

CROSS-REFERENCE TO RELATED APPLICATION(S)

This application is a national stage application under 35 U.S.C. 371 of PCT/US2020/066638, filed Dec. 22, 2020, which claims benefit of and priority to Greek Patent Application No. 2020/0100003, filed Jan. 3, 2020, which are hereby assigned to the assignee hereof and hereby expressly incorporated by reference herein in their entirety as if fully set forth below and for all applicable purposes.

BACKGROUND

Field of the Disclosure

Aspects of the present disclosure relate to wireless communications, and more particularly, to techniques for interworking function selection by a remote user equipment (UE) for UE-to-network sidelink relay access.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include interworking between untrusted non-3GPP networks and 5G core networks via sidelink.

One aspect of the subject matter described in this disclosure can be implemented in a method for wireless communication by a remote user equipment (UE). The method generally includes receiving a plurality of interworking function configurations, for accessing a network via a sidelink relay UE, and a plurality of relay service codes. The method generally includes determining a service to use for communications in the network. The method generally includes selecting one of the plurality of interworking function configurations based on the relay service code for the determined service.

One aspect of the subject matter described in this disclosure can be implemented in a method for wireless communication by a sidelink relay UE. The method generally includes receiving one or more interworking function configurations, for providing a remote UE access to a network via a sidelink, and a plurality of relay service codes. The method generally includes providing an indication to the remote UE of a location of the sidelink relay UE. The method generally includes receiving, from the remote UE, data and an identifier of one of an interworking function associated with one of the one or more interworking function configurations. The method generally includes forwarding the data to one of the interworking function based on the identifier.

One aspect of the subject matter described in this disclosure can be implemented in a method for wireless communication by a network entity. The method generally includes configuring one or more UE as remote UEs and one or more UEs as sidelink relay UEs. The method generally includes providing the one or more remote UEs and sidelink relay UEs with one or more interworking function configurations, for access by the one or more remote UEs to a network via the one or more sidelink relay UEs, and a plurality of relay service codes. The method generally includes receiving data from at least one of the one or more remote UEs via at least one of the one or more sidelink relay UEs and at least one interworking function associated with one of the one or more interworking function configurations.

One aspect of the subject matter described in this disclosure can be implemented in an apparatus for wireless communication. The apparatus generally includes a receiver configured to receive a plurality of interworking function configurations, for accessing a network via a sidelink relay UE, and a plurality of relay service codes. The apparatus generally includes at least one processor and a memory coupled to the at least one processor. The memory coupled with the at least one processor generally includes code executable by the at least one processor to cause the apparatus to determine a service to use for communications in the network. The memory coupled with the at least one processor generally includes code executable by the at least one processor to cause the apparatus to select one of the plurality of interworking function configurations based on the relay service code for the determined service.

One aspect of the subject matter described in this disclosure can be implemented in an apparatus for wireless communication. The apparatus generally includes a receiver configured to receive one or more interworking function configurations, for providing a remote UE access to a network via a sidelink, and a plurality of relay service codes.

The apparatus generally includes at least one processor and a memory coupled to the at least one processor. The memory coupled with the at least one processor generally includes code executable by the at least one processor to cause the apparatus to provide indication to the remote UE of a location of the sidelink relay UE. The receiver is generally configured to receive, from the remote UE, data and an identifier of one of an interworking function associated with one of the one or more interworking function configurations. The memory coupled with the at least one processor generally includes code executable by the at least one processor to cause the apparatus to forward the data to one of the interworking function based on the identifier.

One aspect of the subject matter described in this disclosure can be implemented in an apparatus for wireless communication. The apparatus generally includes at least one processor and a memory coupled to the at least one processor. The memory coupled with the at least one processor generally includes code executable by the at least one processor to cause the apparatus to configure one or more UE as remote UEs and one or more UEs as sidelink relay UEs. The memory coupled with the at least one processor generally includes code executable by the at least one processor to cause the apparatus to provide the one or more remote UEs and sidelink relay UEs with one or more interworking function configurations, for access by the one or more remote UEs to a network via the one or more sidelink relay UEs, and a plurality of relay service codes. The apparatus generally includes a receiver configured to receive data from at least one of the one or more remote UEs via at least one of the one or more sidelink relay UEs and at least one interworking function associated with one of the one or more interworking function configurations.

One aspect of the subject matter described in this disclosure can be implemented in an apparatus for wireless communication. The apparatus generally includes means for receiving a plurality of interworking function configurations, for accessing a network via a sidelink relay UE, and a plurality of relay service codes. The apparatus generally includes means for determining a service to use for communications in the network. The apparatus generally includes means for selecting one of the plurality of interworking function configurations based on the relay service code for the determined service.

One aspect of the subject matter described in this disclosure can be implemented in an apparatus for wireless communication. The apparatus generally includes means for receiving one or more interworking function configurations, for providing a remote UE access to a network via a sidelink, and a plurality of relay service codes. The apparatus generally includes means for providing an indication to the remote UE of a location of the sidelink relay UE. The apparatus generally includes means for receiving, from the remote UE, data and an identifier of one of an interworking function associated with one of the one or more interworking function configurations. The apparatus generally includes means for forwarding the data to one of the interworking function based on the identifier.

One aspect of the subject matter described in this disclosure can be implemented in an apparatus for wireless communication. The apparatus generally includes means for configuring one or more UE as remote UEs and one or more UEs as sidelink relay UEs. The apparatus generally includes means for providing the one or more remote UEs and sidelink relay UEs with one or more interworking function configurations, for access by the one or more remote UEs to a network via the one or more sidelink relay UEs, and a plurality of relay service codes. The apparatus generally includes means for receiving data from at least one of the one or more remote UEs via at least one of the one or more sidelink relay UEs and at least one interworking function associated with one of the one or more interworking function configurations.

One aspect of the subject matter described in this disclosure can be implemented in a computer readable medium storing computer executable code thereon for wireless communication. The computer readable medium generally stores code for receiving a plurality of interworking function configurations, for accessing a network via a sidelink relay UE, and a plurality of relay service codes. The computer readable medium generally stores code for determining a service to use for communications in the network. The computer readable medium generally stores code for selecting one of the plurality of interworking function configurations based on the relay service code for the determined service.

One aspect of the subject matter described in this disclosure can be implemented in a computer readable medium storing computer executable code thereon for wireless communication. The computer readable medium generally stores code for receiving one or more interworking function configurations, for providing a remote UE access to a network via a sidelink, and a plurality of relay service codes. The computer readable medium generally stores code for providing an indication to the remote UE of a location of the sidelink relay UE. The computer readable medium generally stores code for receiving, from the remote UE, data and an identifier of one of an interworking function associated with one of the one or more interworking function configurations. The computer readable medium generally stores code for forwarding the data to one of the interworking function based on the identifier.

One aspect of the subject matter described in this disclosure can be implemented in a computer readable medium storing computer executable code thereon for wireless communication. The computer readable medium generally stores code for configuring one or more UE as remote UEs and one or more UEs as sidelink relay UEs. The computer readable medium generally stores code for providing the one or more remote UEs and sidelink relay UEs with one or more interworking function configurations, for access by the one or more remote UEs to a network via the one or more sidelink relay UEs, and a plurality of relay service codes. T The computer readable medium generally stores code for receiving data from at least one of the one or more remote UEs via at least one of the one or more sidelink relay UEs and at least one interworking function associated with one of the one or more interworking function configurations.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure, for description may admit to other equally effective aspects.

FIG. 8 is a flow diagram illustrating example operations for wireless communication by a BS, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
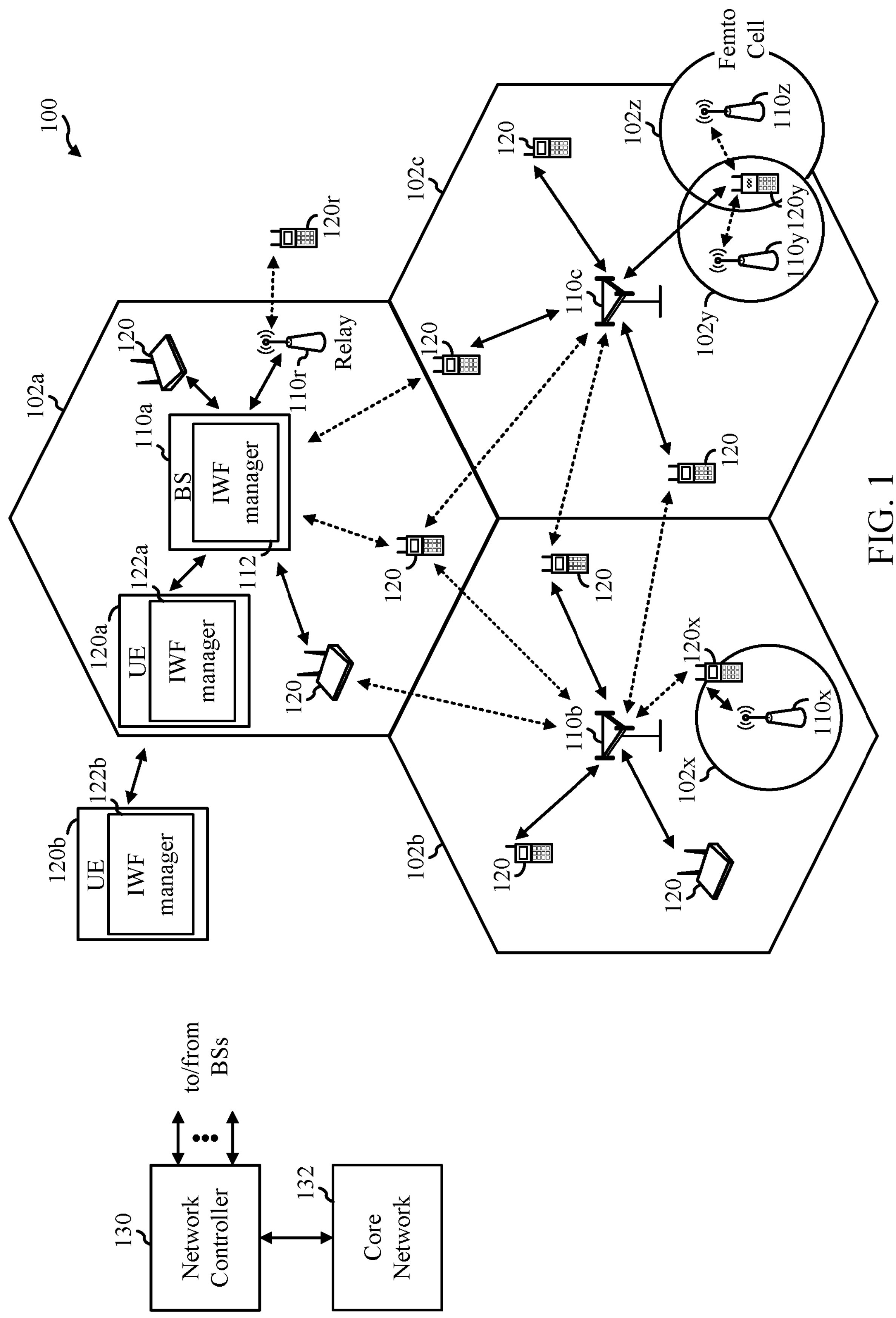
FIG. 1 is a block diagram conceptually illustrating an example telecommunications system, in accordance with certain aspects of the present disclosure.

Aspects of the present disclosure provide apparatus, methods, processing systems, and computer readable mediums for interworking function selection by a remote user equipment (UE) for UE-to-network access via a sidelink relay UE.

A UE that is not within a coverage area of a network, such as a UE outside the coverage of a next generation Node B (gNB) in a 5G network, may be referred to herein as a remote UE. A remote UE may still wish to send traffic over the network. The remote UE may send traffic over the network via a relay UE. The relay UE can act as a route and route traffic based on addresses. However, because the remote UE is not in coverage of the network, the network does not have control over the remote.

According to certain aspects, the remote UE may be provided with a non-access stratum (NAS) connection to a 5G core network via an N3 interworking function (N3IWF) over UE-to-network relay over PC5 sidelink. Aspects of the present disclosure provide for interworking function selection by the remote UE.

The following description provides examples of interworking function selection by a remote UE for UE-network access via a sidelink relay UE in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless networks and radio technologies. For clarity, while aspects may be described herein using terminology commonly associated with 3G, 4G, and/or 5G wireless technologies, aspects of the present disclosure can be applied in other generation-based communication systems, including later technologies.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

NR access (e.g., 5G NR) may support various wireless communication services, such as enhanced mobile broadband (eMBB) targeting wide bandwidth, millimeter wave (mmW) targeting high carrier frequency, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

NR may support beamforming and beam direction may be dynamically configured. NR may support multiple-input multiple-output (MIMO) transmissions with precoding. MIMO configurations in the downlink may support up to 8 transmit antennas with multi-layer downlink transmissions up to 8 streams and up to 2 streams per user equipment (UE).

NR may support multi-layer transmissions with up to 2 streams per UE. NR may support aggregation of up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110*a-z* (each also individually referred to herein as BS 110 or collectively as BSs 110) and/or user equipment (UE) 120*a-y* (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells.

The BSs 110 communicate with UEs 120 in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

According to certain aspects, the BSs 110 and UEs 120 may be configured for interworking between untrusted non-3GPP networks and 5GC with remote UE N3IWF selection. As shown in FIG. 1, the BS 110*a* includes an IWF manager 112*a*; the UE 120*a* includes a IWF manager 122*a*; and the UE 120*b* includes a IWF manager 122*b*, that may be configured for IWF selection by a remote UE for UE-to-network sidelink relay access, in accordance with aspects of the present disclosure.

Figure 2:
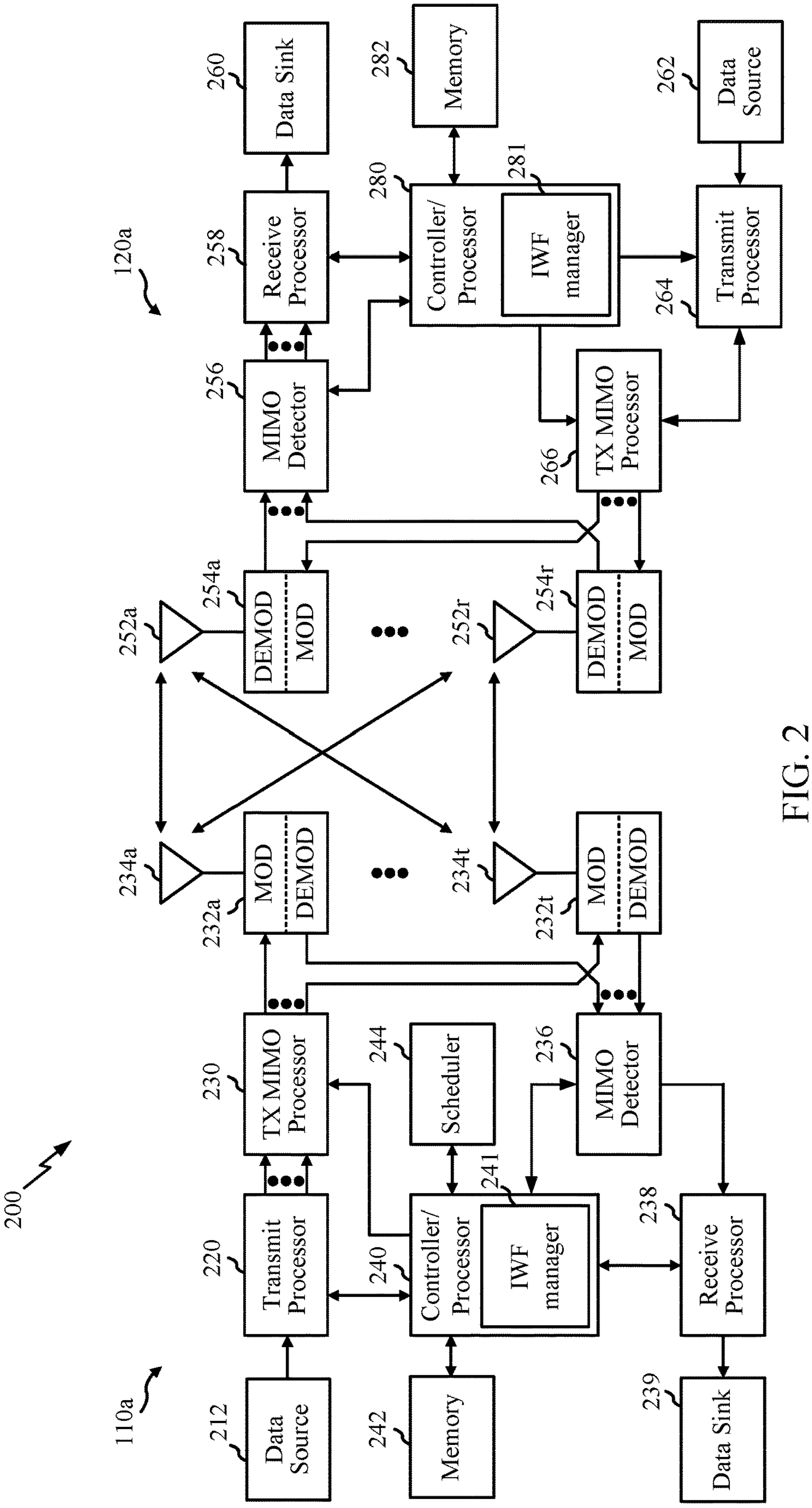
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, the BS 110*a* may transmit a MAC-CE to a UE 120*a* to put the UE 120*a* into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel (PSSCH). A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280, and/or other components of the UE 120*a* may be used to perform the various techniques and methods described herein UE antenna grouping for uplink transmission. Antennas 234, processors 220, 230, 238, and/or controller/processor 240, and/or other components of the BS 110*a* may be used to perform the various techniques and methods described herein UE antenna grouping for uplink transmission. For example, as shown in FIG. 2, the processor 280 of the UE 120*a* has an IWF manager 281 that may be configured for untrusted non-3GPP and 5GC interworking with IWF selection, according to aspects described herein. As shown in FIG. 2, the processor 240 of the BS 110*a* has an IWF configuration manager 241 that may be configured for IWF selection for UE-to-network sidelink relay access, according to aspects described herein.

NR may utilize orthogonal frequency division multiplexing (OFDM) with cyclic prefix (CP) on and single-carrier frequency division multiplexing (SC-FDM) on the uplink and/or downlink. NR may support half-duplex operations using time division duplexing (TDD). OFDM and SC-FDM partition the system bandwidth into multiple orthogonal subcarriers, also referred to as tones, bins, etc. Each subcarrier may be modulated with data. Modulation symbols are sent in the frequency domain with OFDM and in the time domain with SC-FDM. The spacing between adjacent subcarriers may be fixed, and the total number of subcarriers may be dependent on the system bandwidth. In NR, the minimum resource allocation (e.g., a resource block (RB)) may be 12 consecutive subcarriers (or 180 kHz). The system bandwidth may also be partitioned into subbands that may cover multiple RBs (e.g., 6 RBs). NR may support a base subcarrier spacing (SCS) of 15 KHz and other SCS may be defined with respect to the base SCS (e.g., 30 kHz, 60 kHz, 120 kHz, 240 kHz, etc.).

Figure 3:
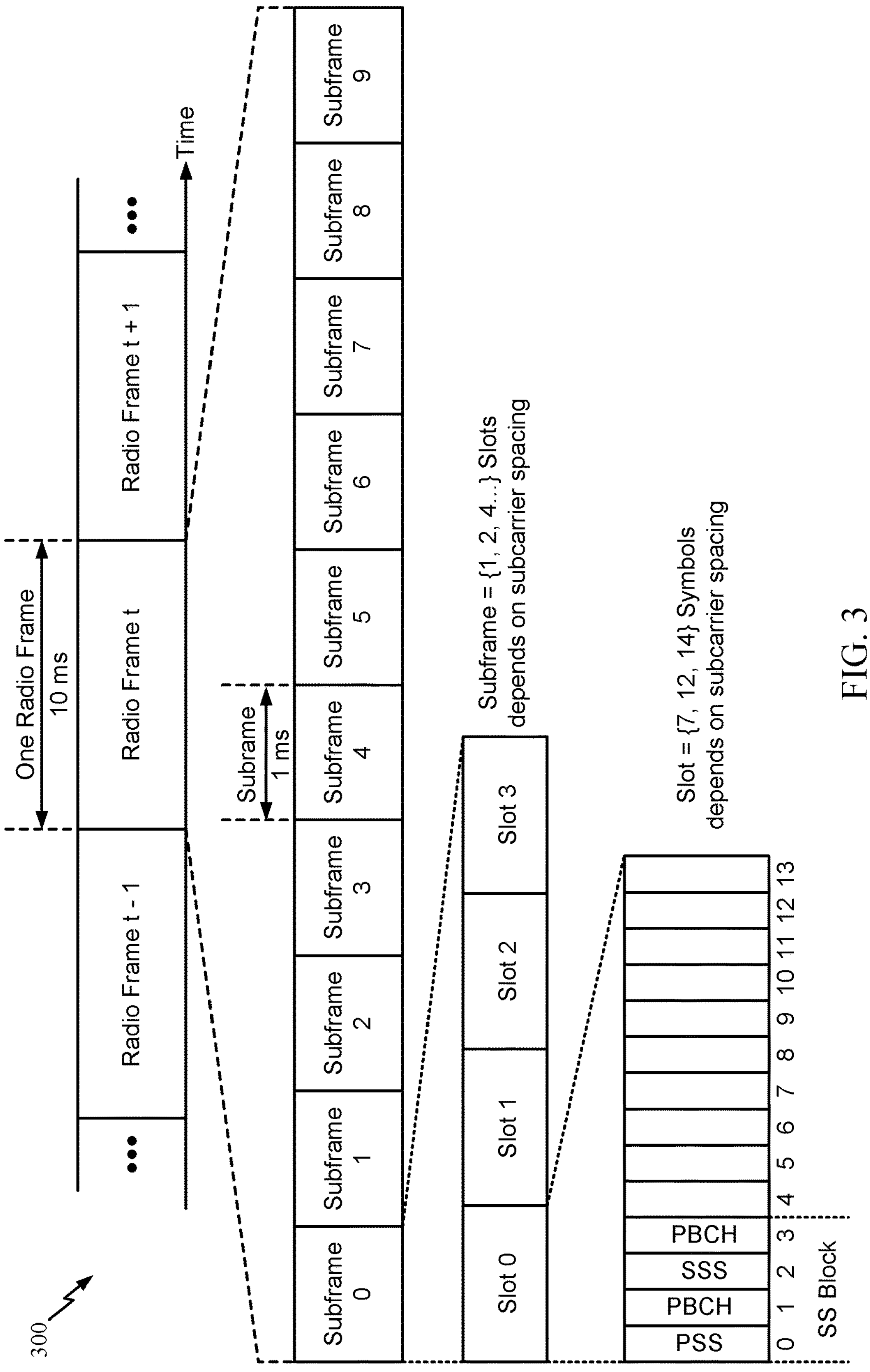
FIG. 3 is an example frame structure, in accordance with aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. In NR, the basic TTI is referred to as a slot. Each subframe may include a variable number of slots depending on the SCS. Each slot may include a variable number of symbol periods (e.g., 7 or 14 symbols) depending on the SCS. The symbol periods in each slot may be assigned indices. A sub-slot structure may include a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data and/or DL/UL control information.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120*a*) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Aspects of the present disclosure relate to interworking. Interworking may be between untrusted non-3GPP networks and a 5G core network (5GC). The 5GC (e.g., such as CN 132 of wireless communication network 100) may support the connectivity of a UE via non-3GPP access networks. In some examples, a remote UE (not within coverage of a gNB in the 5GC) can access the 5GC via UE-to-network relay and a non-3GPP interworking function (N3IWF). The N3IWF may be an element of the 5G SBA (service based architecture). The N3IWF is responsible for interworking between untrusted non-3GPP networks and the 5GC. The N3IWF may support both N2 interface and N3 interface based connectivity to the 5GC, and may support Internet protocol security (IPSec) connectivity.

Figure 4:
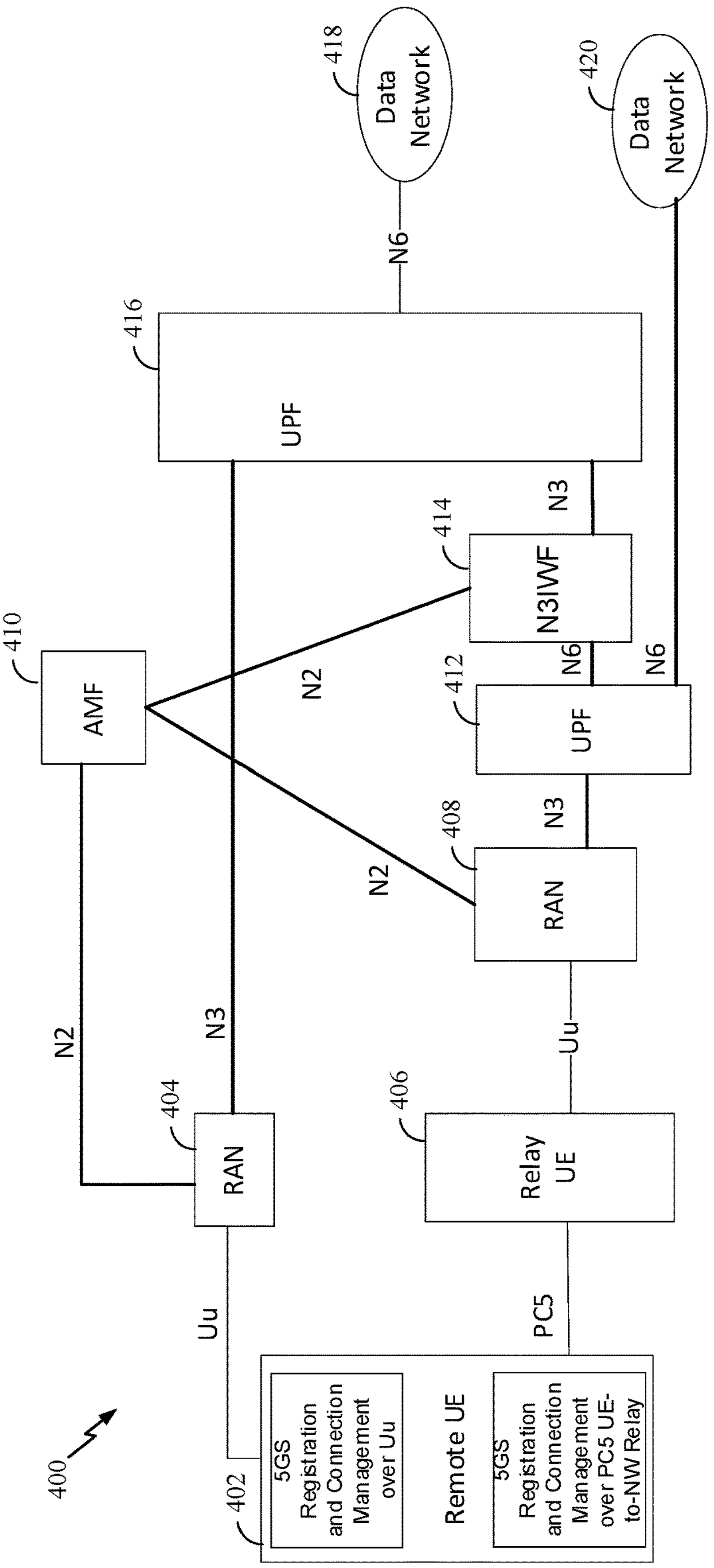
FIG. 4 is an example non-roaming architecture for a remote UE in an untrusted non-3GPP network with non-access stratum (NAS) connection to a 5G core (5GC) via a PC5 connection to another UE and N3 interworking function (N3IWF), in accordance with aspects of the present disclosure.

FIG. 4 is an example non-roaming architecture 400 for a remote UE 402 with a non-access stratum (NAS) connection to a 5GC via a PC5 connection to another relay UE 406 and N3IWF 414, in accordance with aspects of the present disclosure.

5GC may be implemented by one or more network entities that perform the network functions (NF) including access and mobility management function (AMF) and user plane function (UPF).

The AMF may include the following functionality (some or all of the AMF functionalities may be supported in one or more instances of an AMF): termination of RAN control plane interface (N2); termination of NAS (N1), NAS ciphering and integrity protection; registration management; connection management; reachability management; mobility management; lawful intercept (for AMF events and interface to LI system); transport for SM messages between UE and session management function (SMF); transparent proxy for routing SM messages; access authentication; access authorization; transport for SMS messages between UE and SMSF; security anchor functionality (SEAF); security context management (SCM), which receives a key from the SEAF that it uses to derive access-network specific keys; location services management for regulatory services; transport for location services messages between UE and LMF as well as between RAN and LMF; EPS Bearer ID allocation for interworking with EPS; and UE mobility event notification.

In addition to the functionalities of the AMF described above, the AMF may include the functionality to support non-3GPP access networks: support of N2 interface with N3IWF; support of NAS signaling with a UE over N3IWF; support of authentication of UEs connected over N3IWF; management of mobility, authentication, and separate security context state(s) of a UE connected via non-3GPP access or connected via 3GPP and non-3GPP accesses simultaneously; support a coordinated RM management context valid over 3GPP and Non 3GPP accesses; and support dedicated CM management contexts for the UE for connectivity over non-3GPP access.

As shown in FIG. 4, NAS registration and connection management is extended over sidelink UE-to-NW relay access using N3IWF 414 for the UE-to-NW relay path. That is, the N3IWF 414 should be reachable by the remote UE 402 over the UE-to-NW relay access path. The remote UE 402 may also support independent 5G registration and connection management procedures over both the Uu (via the RAN 404, AMF 410, and UPF 416 to the data network 418) and the UE-to-NW relay over PC5 (via the relay UE 407, RAN 408, AMF 410, UPF 412, and N3IWF 414 to the data network 418 and 420). Thus, the 5GC can authorize and authenticate the remote UE operation over UE-to-NW Relay path. The remote UE discovers the N3IWF and sends the NAS signaling to the N3IWF IP address. The relay UE establishes a relay protocol data unit (PDU) session and relays both NAS and UP traffic to the N3IWF.

In some examples, existing N3IWF techniques can be extended to support new functionality for UE-to-NW access to 5GC via N3IWF or a new networking function deployed in the 5GC to support UE-to-NW access to 5GC. In some examples, a remote UE also has a direct connection (e.g., via uU) to the 5GC and/or N3IWF and also can access the network for UE-to-NW access to 5GC via a sidelink relay UE and/or the N3IWF.

In some examples, the remote UE 402 can perform registration to the 5GC during an Internet key exchange, IKEv2 secure access establishment procedure (e.g., as specified in 3GPP TS 24.501). After the registration, the UE supports NAS signaling with the 5GC using the N1 reference point (e.g., as specified in 3GPP TS 24.501). The N3IWF interfaces the 5GC control protocol (CP) function via the N2 interface to the AMF and the 5GC UP functions via N3 interface to the user plane function (e.g., as described in 3GPP TS 23.501).

When the network has an N3IWF deployed for UE-to-NW Relay access, the network may route Remote UE UP traffic for certain relay service codes via N3IWF after the network authorized the remote UE over NAS (e.g., and not prior to that). This may provide end-to-end security via the IPSec tunnel for the remote UE UP traffic.

Figure 5:
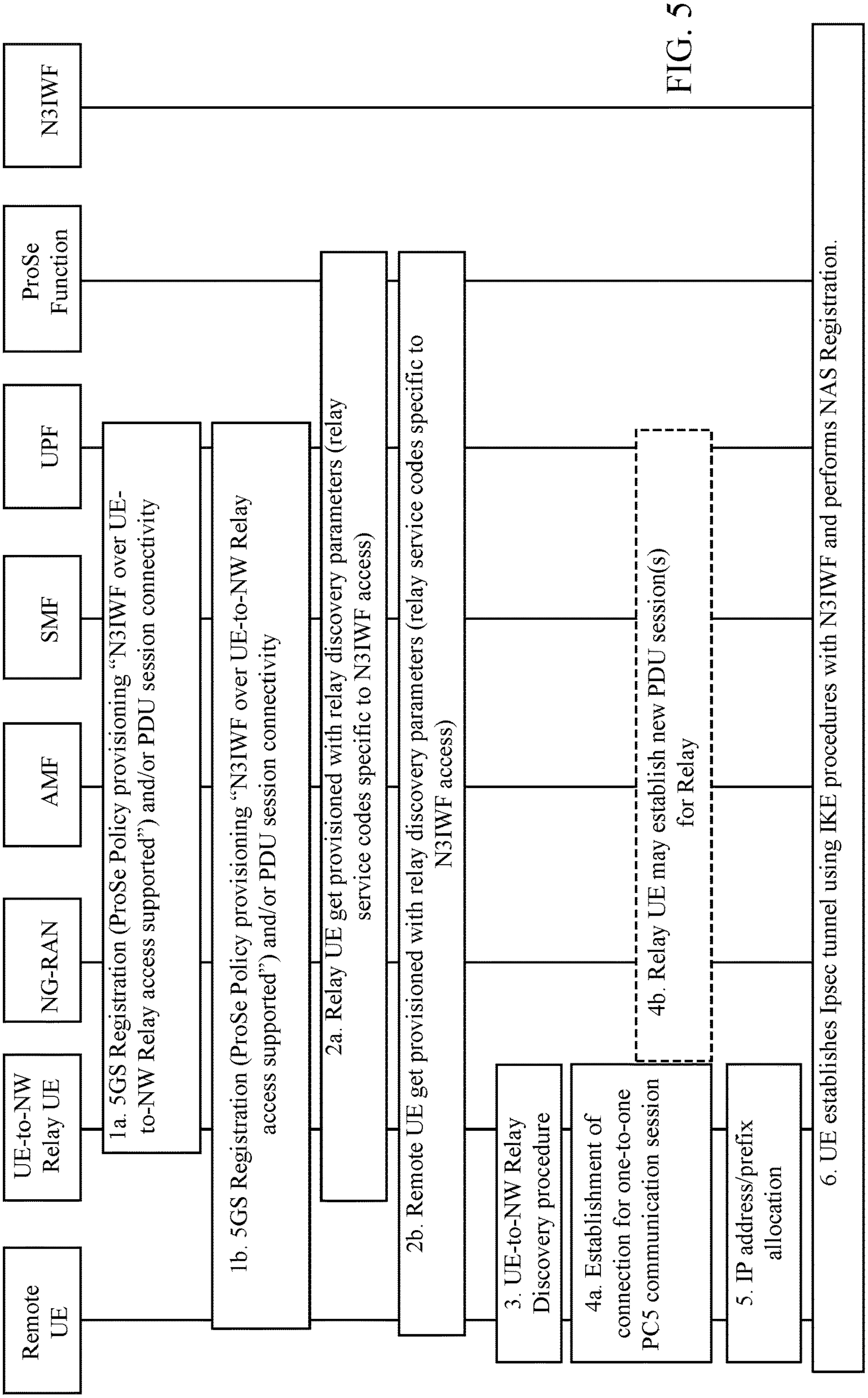
FIG. 5 is a call flow diagram illustrating example signaling for remote UE NAS over PC5 UE UE-to-network access via N3IWF.

FIG. 5 is a call flow diagram illustrating example signaling for the remote UE NAS over PC5 UE-to-network access via N3IWF. Control plane signaling may include remote UE and network procedures for supporting 5G system (5GS) registration and connection management from remote UE to the network over UE-to-NW relay access (e.g., as defined in section 4.12 of TS23.502).

In some examples, when the remote UE and the relay UE are in-coverage of the BS (e.g., gNB), the remote UE and relay UE may perform Uu registration (block 1*a* and block 1*b* in FIG. 5). As part of the registration, the UEs obtain the N3IWF policy information.

As shown in FIG. 5, as part of registration via the UPF (at block 1*a* and block 1*b*), the remote UE and/or the relay can indicate capability to support connection to the 5GC via N3IWF (e.g., support for using IKE procedures to setup IPSec tunnel with N3IWF), such as an indication in the Uu registration message. In some examples, during the Uu registration, the UEs are provisioned with the policy/parameters for proximity security (ProSe) communications by the AMF. The ProSe policy for Relay operation may indicate to the relay UE, whether the network supports UE-to-NW Relay path access to 5GC via N3IWF and whether it is allowed to support access to 5GC via N3IWF. A remote UE operating while out-of-coverage (OOC) of the gNB, even without Uu Registration, can be preconfigured with the N3IWF policy information.

In some examples, relay service codes may be used to identify a connectivity service the ProSe relay UE provides. As shown in FIG. 5, the relay UE may be provisioned with relay discovery parameters (at block 2*a*) including relay service codes and the remote UE may be provisioned with relay discovery parameters (at block 2*b*) including the relay service codes (at block 2*b*). Remote UEs interested in a UE-to-NW relay for a connectivity service may discover the relay UE by monitoring the corresponding relay service code (at block 3). The relay UE may then establish a dedicated PDN connection over Uu for each supported relay service for UE-to-Network relay connectivity (at block 4*a*). For example, the relay UE may establish a dedicated PDU session for each relay service code during PC5 unicast link setup with the remote UE (at block 4*b*).

The remote UE may establish a PC5 connection with the UE-to-NW Relay and obtains an IP address (at block 5). The remote UE may establish an IPsec tunnel with the N3IWF over PC5 Relay path (e.g. using IKE procedures, at block 6). Subsequent NAS messages between the UE and N3IWF may be exchanged via the signalling IPsec SA over TCP/IP. Authentication and authorization of the remote UE by the 5GC can be supported (e.g., similar to Uu). In the user plane, the relay UE may carry the remote UE user plane and NAS traffic over relay PDU session(s) to the N3IWF via the IPSec tunnel. The N3IWF delivers the NAS traffic to the UPF.

What is needed are techniques and apparatus for IWF selection.

Example Interworking Function Selection by Remote UE

Aspects of the present disclosure provide techniques and apparatus for interworking function (IWF) selection by a remote user equipment (UE).

In some examples, IWF selection may include non-3GPP interworking function (N3IWF) selection procedures (e.g., in section 6.3.6.2 of TS 23.501) for untrusted non-3GPP access. For example, the IWF selection procedures may include the evolved packet data gateway (ePDG) selection procedures (e.g., in section 4.5.4 of TS 23.402). For IWF selection by a remote UE with a non-access stratum (NAS) connection to the 5G core network (5GC) via a sidelink (e.g., PC5) with a sidelink relay UE and the IWF, additional signaling and information may also be used.

As discussed above, as part of a registration procedure, a UE (e.g., the remote UE and/or the relay UE) can be configured with policy information. The policy information may include parameters for IWF selection. If the remote UE is out-of-coverage of the network, the UE may be preconfigured with the policy information. The policy information may include N3IWF configuration information, sidelink policy information, proximity security (ProSe) communication policy information, and the like.

According to aspects of the present disclosure, the policy information may (e.g., additionally) include UE-to-NW relay access IWF identifier configuration information and IWF selection information. The policy information may configure supported services. The policy information may configure a UE as a remote UE, a relay UE, or both.

In some examples, the UE-to-NW relay access IWF identifier configuration information may be provided for an associated home public land mobile network (HPLMN). In some examples, the UE-to-NW relay access IWF identifier configuration information includes a single IWF identifier configuration of an IWF in the HPLMN. The IWF identifier configuration may include a fully qualified domain name (FQDN) or Internet Protocol (IP) address associated with the IWF.

In some examples, the UE-to-NW relay access IWF identifier configuration information may include multiple IWF identifier configurations. Each IWF identifier configuration may be associated with a specific relay service code. In some examples, certain sidelink relay UEs and associated IWFs may be configured for police traffic only, public safety traffic only, and/or other types of traffic and/or services.

In some examples, the UE-to-NW relay access IWF identifier configuration information may include the relay service codes. In this case, the remote UE may derive the IWF identifier configuration using the relay service code. For example, the relay service code configured by the operator may have an operator/PLMN-specific identifier as part of the relay service code.

In some examples, the UE-to-NW relay access IWF selection configuration information may include a prioritized list of PLMNs that are preferred for IWF selection. The UE-to-NW relay access IWF selection configuration information may include an indication of whether IWF selection in a PLMN should be based on a tracking area identity (TAI) and/or location area identity (e.g., a TAI FQDN) or based on an operator identifier (e.g., FQDN associated with the operator). The prioritized list of preferred PLMNs may include an entry indicating "any PLMN" matching any PLMN the UE is connected to except the HPLMN. In some examples, the PLMNs included in the IWF selection information may be PLMNs that have roaming agreements with the HPLMN for interworking with UE-to-NW relay UEs.

According to certain aspects, the remote UE selects the IWF and then constructs the identifier (e.g., FQDN or IP address) using the TAI or operator identifier based on the indication in the policy information. For example, the remote UE may construct the IWF identifier based on the tracking area in which the UE is located. The remote UE may use the 5GS TAI when the UE is registered to the 5GS. The remote UE may construct the N3IWF identifier based on the operation identifier using the PLMN ID that the UE is in as the operator identifier.

In some cases, the remote UE may not have information regarding the relay UE PLMN or TAI to perform the IWF selection and construct the IWF identifier (e.g., FQDN). According to certain aspects, the relay UE may provide the remote UE with the PLMN and/or TAI information of the relay UE, for example, to assist the remote UE in performing the N3IWF selection and constructing the IWF identifier. In some examples, the relay UE may provide its PLMN ID and/or TAI to the remote UE in a broadcast message to the remote UE. For example, the relay UE may provide its PLMN ID and/or TAI to the remote UE in a PC5 UE-to-NW discovery announcement message, in a UE-to-NW relay discovery response message, or in a relay discovery additional information message. In some examples, the relay UE may provide its PLMN ID and/or TAI to the remote UE in a unicast message to the remote UE. For example, the relay UE may provide its PLMN ID and/or TAI to the remote UE in a PC5-S direct communication accept message, which may be sent after successful unicast link setup.

Once the remote UE has the relay UE location information, the remote UE can select the IWF. When the remote UE determines that the relay UE is located in the HPLMN of the remote UE, then the remote UE can use the HPLMN IWF identifier configuration to select an IWF and connect to the 5GC via the relay UE. When the remote UE determines that the relay UE is in a different PLMN than the remote UE (e.g., the relay UE is not the HPLMN of the remote UE), then the remote UE may select a PLMN and IWF based on the prioritized list of preferred PLMNs.

In some examples, after performing discovery and based on the prioritized list, the remote UE may decide to set up unicast link with only specific sidelink relay UEs having PLMNs included in the prioritized list.

Figure 6:
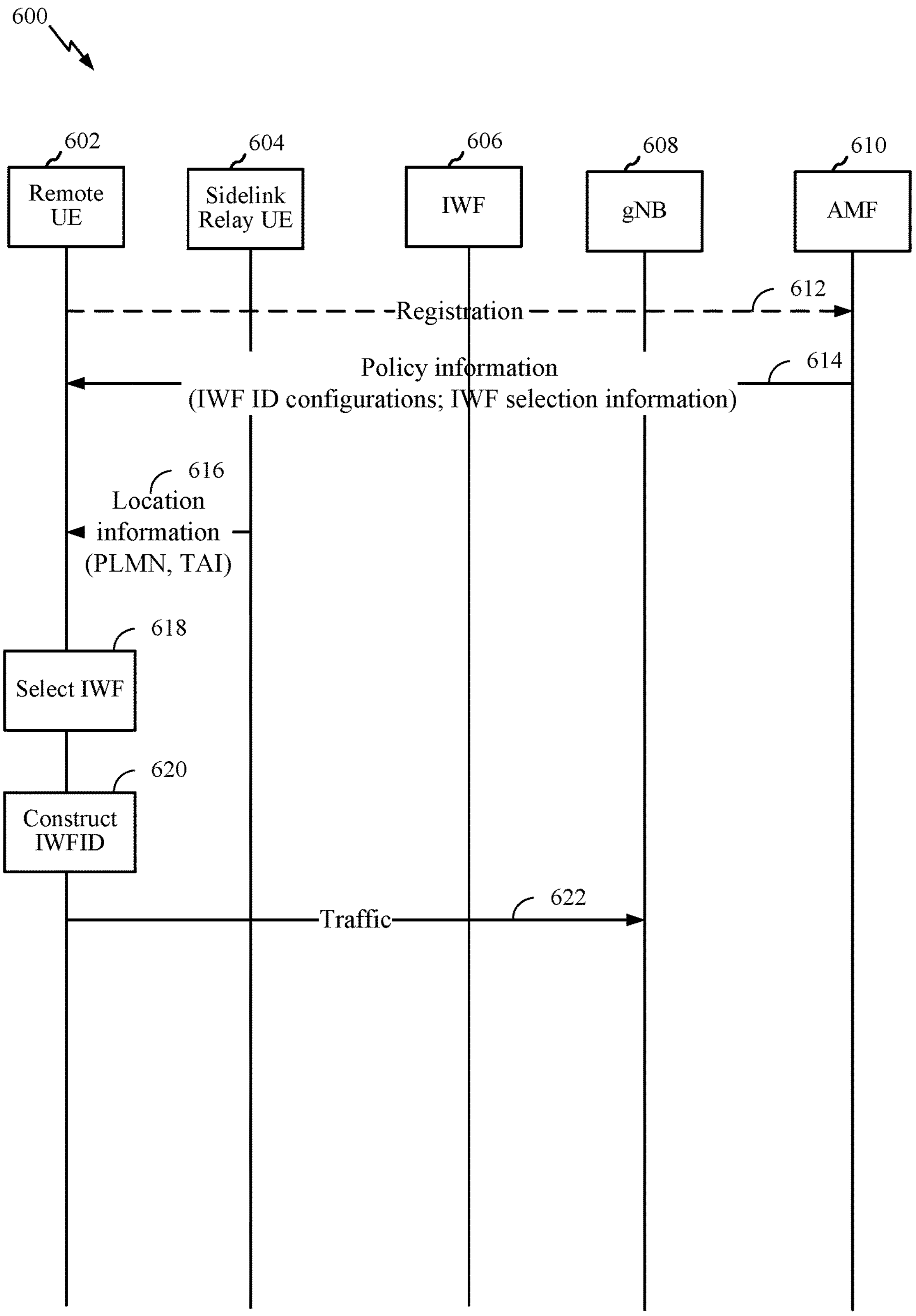
FIG. 6 is a call flow diagram illustrating example signaling for remote UE NAS over PC5 UE UE-to-network access via N3IWF with N3IWF selection by the remote UE, in accordance with aspects of the present disclosure.

FIG. 6 is a call flow diagram illustrating example signaling 600 for remote UE NAS over UE-to-network access via IWF with IWF selection by the remote UE 602, in accordance with aspects of the present disclosure. As shown in FIG. 6, the remote UE 602 registers with the AMF 610, at 612. At 614, the remote UE 602 receives policy information from the AMF 610. In some examples, the policy information is preconfigured (e.g., when the remote UE 602 is out-of-coverage). In some examples, the policy information is provided duration the registration procedure, at 612. The policy information includes the IWF ID configurations and the IWF selection information. As discussed above, the IWF ID configurations may each be associated with a relay service code. As discussed above, IWF selection information may include the prioritized list of preferred PLMNs. The policy information may further configure whether to determine the IWF ID using a TAI or operator ID.

As shown in FIG. 6, at 616, the remote UE 602 may receive location information form the sidelink relay UE 604. For example, the remote UE 602 may indicate the PLMN ID or TAI.

As shown in FIG. 6, the remote UE 602 selects an IWF. For example, if the PLMN of the sidelink relay UE 604 is the HPLMN of the remote UE 602, the remote UE may select the IWF from that PLMN. If the PLMN of the sidelink relay UE 604 is not in the HPLMN of the remote UE 602, then the remote UE 602 selects a IWF (e.g., a N3IWF) from a PLMN in the prioritized list of preferred PLMNs.

Once the remote UE 602 selects the IWF, the remote UE 602 constructs the ID (e.g., the FQDN or IP address) of the selected IWF, for example, using the TAI or operator ID.

The remote UE 602 may then send traffic (e.g., a type of traffic associated with relay service code and IWF configuration) and include the IWF ID to the sidelink relay UE 604. The sidelink relay UE 604 forwards the traffic to the IWF 606 based on the indicated IWF ID and, in turn, the IWF 606 forwards the traffic to the network (e.g., gNB 608).

Figure 7:
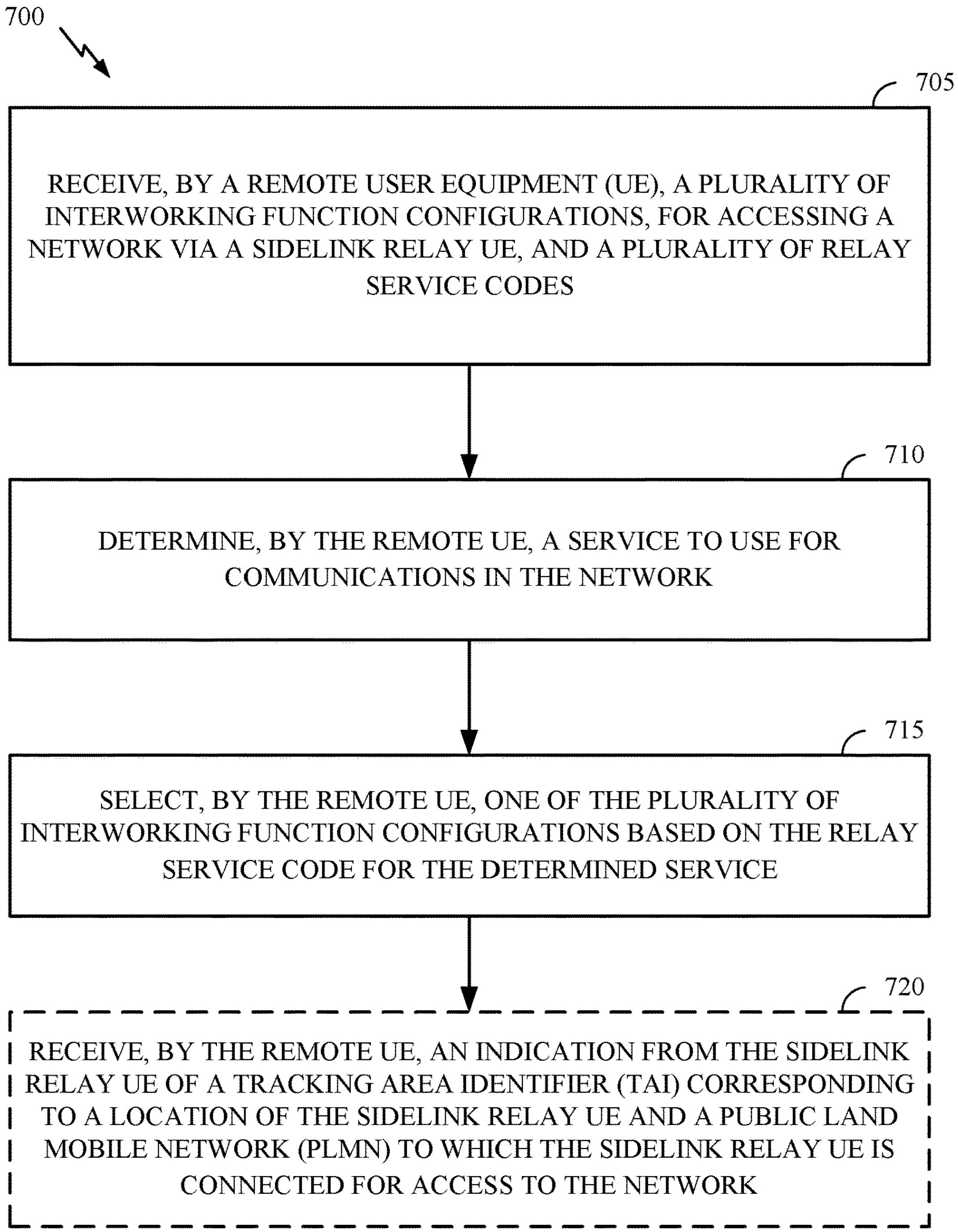
FIG. 7 is a flow diagram illustrating example operations for wireless communication by a remote UE, in accordance with certain aspects of the present disclosure.

FIG. 7 is a flow diagram illustrating example operations 700 for wireless communication, in accordance with certain aspects of the present disclosure. The operations 700 may be performed, for example, by a remote UE (e.g., such as the UE 120*b* in the wireless communication network 100). The operations 700 may be complimentary operations by the remote UE to the operations 800 performed by the network entity and operations 900 performed by the sidelink relay UE. Operations 700 may be implemented as software components that are executed and run on one or more processors (e.g., controller/processor 280 of FIG. 2). Further, the transmission and reception of signals by the remote UE in operations 700 may be enabled, for example, by one or more antennas (e.g., antennas 252 of FIG. 2). In certain aspects, the transmission and/or reception of signals by the remote UE may be implemented via a bus interface of one or more processors (e.g., controller/processor 280) obtaining and/or outputting signals.

The operations 700 may begin, at block 705, by receiving a plurality of interworking function configurations, for accessing a network via a sidelink relay UE, and a plurality of relay service codes. The network may be a 3GPP network (e.g., 5G). Each interworking function configuration may be associated with a relay service code. The plurality of interworking function configurations may include one or more N3IWF configurations. The plurality of interworking functions and the plurality relay service codes may be received in sidelink policy information. The sidelink policy information may be configured by a network entity, such as an authorization and management function (AMF) or a policy control function (PCF). The plurality of interworking functions and the plurality relay service codes may be received during a NAS registration procedure or during a pre-configuration procedure. The plurality of interworking function configurations may include FQDNs or IP addresses of the interworking functions. In some examples, the remote UE derives the FQDNs or IP addresses based on the relay service codes.

In some examples, the remote UE further receives interworking function configuration selection information (e.g., in the sidelink policy information). For example, the interworking function configuration selection information may include a prioritized list of preferred PLMNs for interworking function selection. The list may include the HPLMN associated with the PLMNs. The interworking function configuration selection information may include an indication to select an interworking function configuration based on a TAI, location area identifier, or operator identifier.

At block 710, the remote UE determines a service to use for communications in the network.

At block 715, the remote UE selects one of the plurality of interworking function configurations based the relay service code for the determined service. For example, the UE may select the interworking function configuration associated with the relay service code for the determined service.

The remote UE may determine the FQDN for the selected interworking function configuration as the FQDN of the TAI or location area identifier of the area in which the remote UE is located or as FQDN of the operator using the ID of the PLMN associated with the selected interworking function configuration.

In some examples, at block 720, the remote UE receives an indication from the sidelink relay UE of the PLMN and TAI, corresponding to the location of the sidelink relay UE, to which the sidelink remote UE is connected for network access. The indication may be received in a broadcast discovery announcement message, a relay discovery additional information message, or a unicast direct communication accept message sent by the sidelink relay UE.

In some examples, the remote UE selects the interworking function configuration based on the HPLMN interworking function identifier when the remote UE and a sidelink relay UE associated with the selected interworking function configuration are located in the same HPLMN. In some examples, the remote UE selects the interworking function configuration based on the prioritized list of preferred PLMNs when the remote UE and a sidelink Relay UE associated with the selected interworking function configuration are located in different HPLMNs.

After performing a sidelink relay discovery procedure, the remote UE may determine to establish a sidelink unicast link only with relay UEs that are in a PLMN in the prioritized list, and the remote UE selects an interworking function configuration associated with one of the relay UEs.

According to certain aspects, the remote UE accesses the network via an access link (e.g., uU) or via a PC5 sidelink UE-to-NW relay access provided by a sidelink relay UE. The remote UE may include the determined FQDN for the selected interworking function.

FIG. 8 is a flow diagram illustrating example operations 800 for wireless communication, in accordance with certain aspects of the present disclosure. The operations 800 may be performed, for example, by a network entity (e.g., such as the BS 110*a* or an entity in the CN 132 in the wireless communication network 100). The operations 800 may be complimentary operations by the network entity to the operations 700 performed by the remote UE and/or the operations 900 performed by the sidelink relay UE.

The operations 800 may begin, at block 805, by configuring one or more UE as remote UEs and one or more UEs as sidelink relay UEs.

At block 810, the network entity provides the one or more remote UEs and one or more sidelink relay UEs with one or more interworking function configurations, for access a by the one or more remote UEs to a network via the one or more sidelink relay UEs, and a plurality of relay service codes. The network may be a 3GPP network (e.g., 5G). The one or more interworking function configurations and plurality of relay service codes may be provided in sidelink policy information. Each interworking function configuration may be associated with a relay service code. The sidelink policy information may further include additional information as discussed above.

At block 815, the network entity receives data from at least one of the one or more remote UEs via at least one of the one or more sidelink relay UEs and at least one interworking function associated with one of the one or more interworking function configurations.

Figure 9:
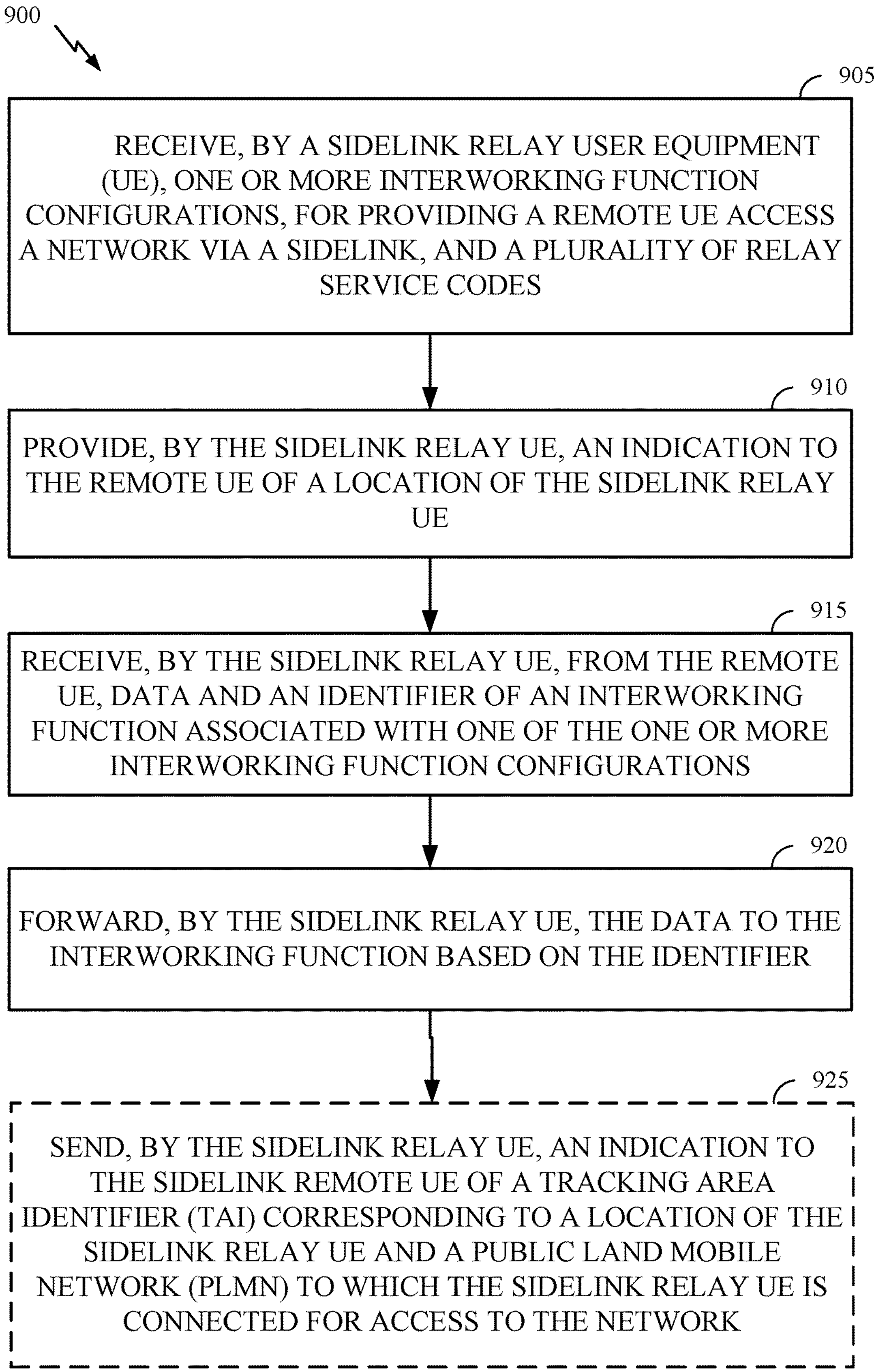
FIG. 9 is a flow diagram illustrating example operations for wireless communication by a sidelink relay UE, in accordance with certain aspects of the present disclosure.

FIG. 9 is a flow diagram illustrating example operations 900 for wireless communication, in accordance with certain aspects of the present disclosure. The operations 900 may be performed, for example, by a sidelink relay UE (e.g., such as a UE 120*a* in the wireless communication network 100). The operations 900 may be complimentary operations by the sidelink relay UE to the operations 700 by the remote UE and/or the operations 800 performed by the network entity. Operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at block 905, by receiving one or more interworking function configurations, for providing a remote UE access to a network via a sidelink, and a plurality of relay service codes. The network may be a 3GPP network (e.g., 5G). The one or more interworking function configurations and the plurality of relay service codes may be received in sidelink policy information. Each interworking function configuration may be associated with a relay service code.

At block 910, the sidelink relay UE provides an indication to a remote UE of a location of the sidelink relay UE. As shown at block 925, the sidelink relay UE may send an indication to the remote of a TAI corresponding to a location of the sidelink relay UE and a PLMN to which the sidelink relay UE is connected for access to the network.

At 915, the sidelink relay UE receives, from the remote UE, data and an identifier of an interworking function associated with one of the one or more interworking functions.

At 920, the sidelink relay UE forwards the data to the interworking function based on the identifier.

Figure 10:
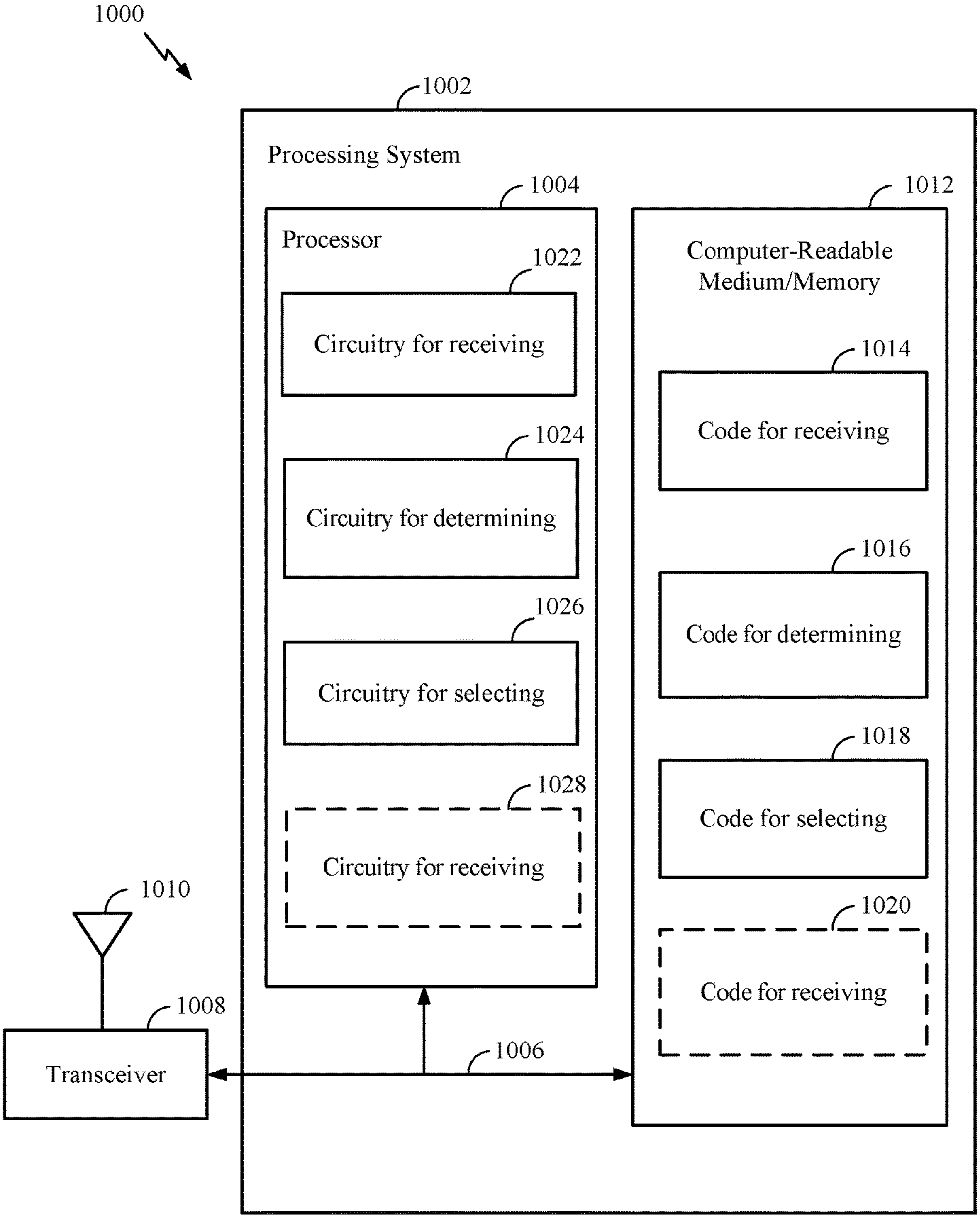
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7, or other operations for performing the various techniques discussed herein for interworking function selection. In certain aspects, computer-readable medium/memory 1012 stores code 1014 for receiving (e.g., code for receiving a plurality of interworking function configurations, for accessing a network via a sidelink relay UE, and a plurality of relay service codes); code 1016 for determining (e.g., code for determining a service to use for communications in the network); code 1018 for selecting (e.g., code for selecting one of the plurality of interworking function configurations based on the relay service code for the determined service); and/or code 1020 for receiving (e.g., code for receiving an indication from the sidelink relay UE of a TAI corresponding to a location of the sidelink relay UE and a PLMN to which the sidelink relay UE is connected for access to the network), in accordance with aspects of the disclosure. In certain aspects, the processor 1004 has circuitry configured to implement the code stored in the computer-readable medium/memory 1012. The processor 1004 includes circuitry 1022 for receiving; circuitry 1024 for determining; circuitry 1026 for selecting; and/or circuitry 1028 for receiving, in accordance with aspects of the disclosure.

Figure 11:
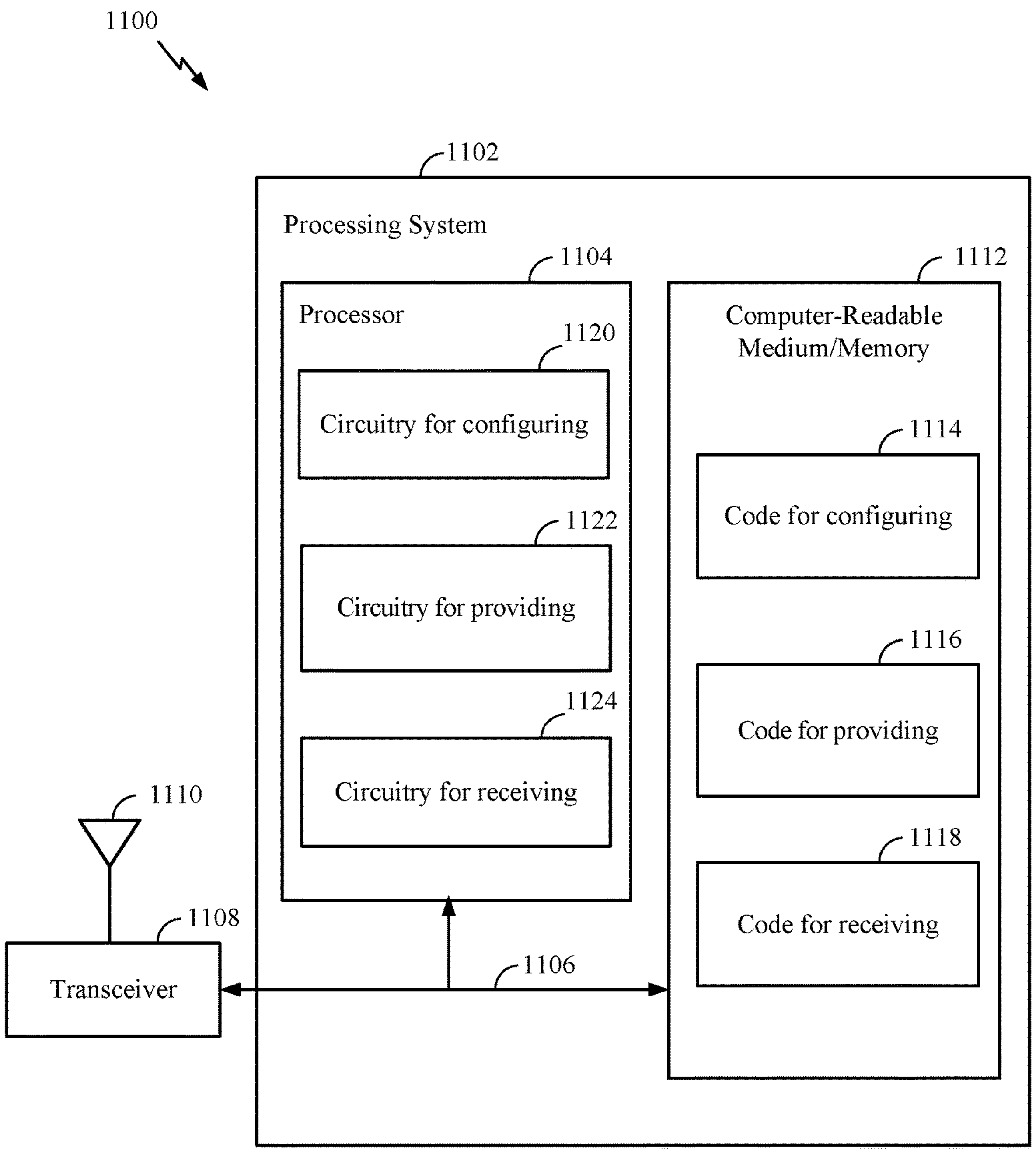
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein for interworking function selection. In certain aspects, computer-readable medium/memory 1112 stores code 1114 for configuring (e.g., code for configuring one or more UE as remote UEs and one or more UEs as sidelink relay UEs); code 1116 for providing (e.g., code for providing the one or more remote UEs and sidelink relay UEs with one or more interworking function configurations, for access by the one or more remote UEs to a network via the one or more sidelink relay UEs, and a plurality of relay service codes); and/or code 1118 for receiving (e.g., code for receiving data from at least one of the one or more remote UEs via at least one of the one or more sidelink relay UEs and at least one interworking function associated with one of the one or more interworking function configurations), in accordance with aspects of the disclosure. In certain aspects, the processor 1104 has circuitry configured to implement the code stored in the computer-readable medium/memory 1112. The processor 1104 includes circuitry 1120 for configuring; circuitry 1122 for providing; and/or circuitry 1123 for receiving, in accordance with aspects of the disclosure.

Figure 12:
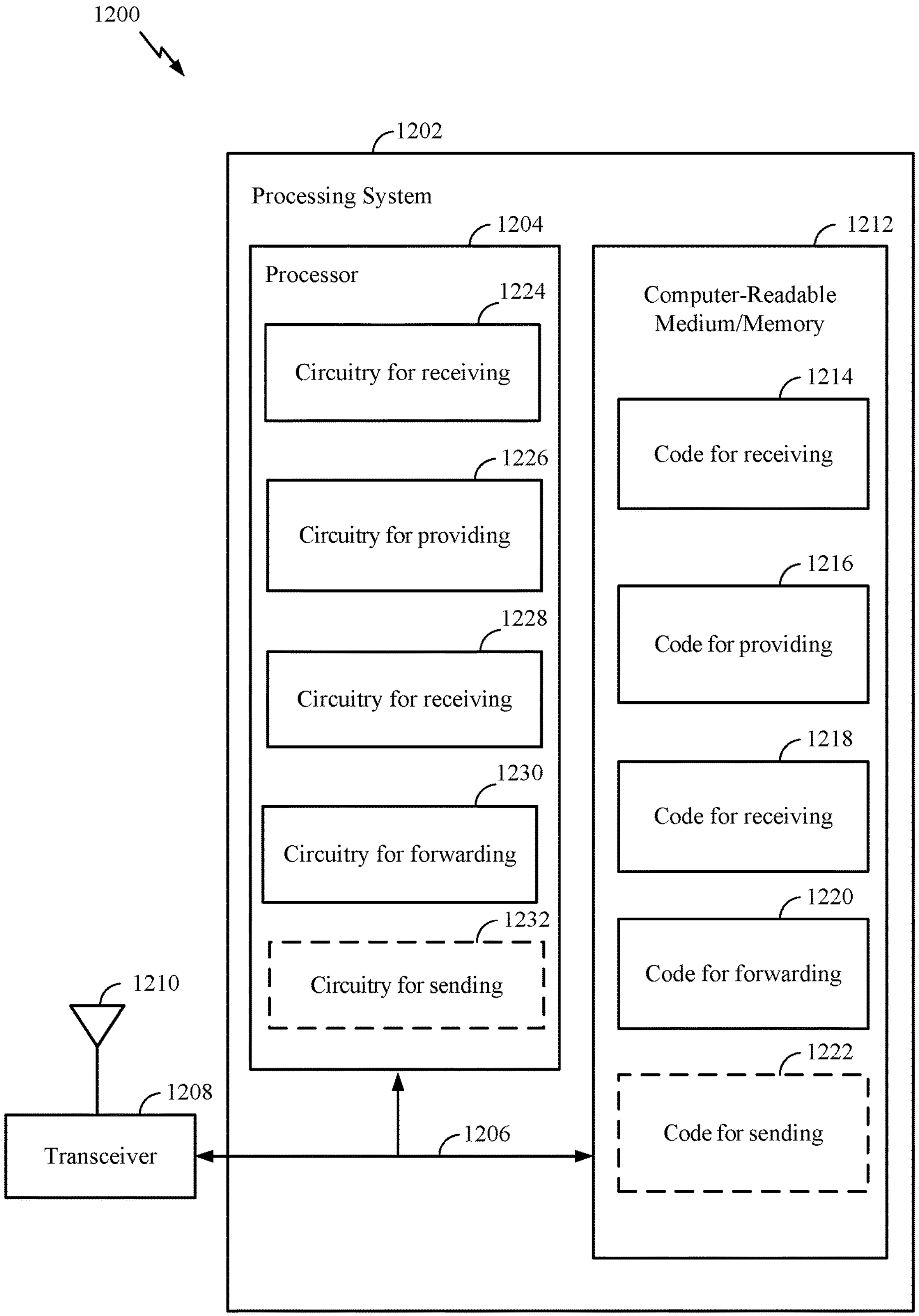
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 9, or other operations for performing the various techniques discussed herein for interworking function selection. In certain aspects, computer-readable medium/memory 1212 stores code 1214 for receiving (e.g., code for receiving one or more interworking function configurations, for providing a remote UE access to a network via a sidelink, and a plurality of relay service codes); code 1016 for providing (e.g., code for providing an indication to the remote UE of a location of the sidelink relay UE); code 1018 for receiving (e.g., code for receiving, from the remote UE, data and an identifier of one of an interworking function associated with one of the one or more interworking function configurations); code 1020 for forwarding (e.g., code for forwarding the data to one of the interworking function based on the identifier); and/or code 1020 for sending (e.g., code for sending an indication to the remote UE of a TAI corresponding to a location of the sidelink relay UE and a PLMN to which the sidelink relay UE is connected for access to the network), in accordance with aspects of the disclosure. In certain aspects, the processor 1004 has circuitry configured to implement the code stored in the computer-readable medium/memory 1012. The processor 1004 includes circuitry 1024 for receiving; circuitry 1026 for providing; circuitry 1028 for receiving; circuitry 1030 for forwarding; and/or circuitry 1032 for sending, in accordance with aspects of the disclosure.

EXAMPLE ASPECTS

Implementation examples are described in the following numbered clauses:

1. A method for wireless communication by a remote user equipment (UE), comprising: receiving a plurality of interworking function configurations, for accessing a network via a sidelink relay UE, and a plurality of relay service codes; determining a service to use for communications in the network; and selecting one of the plurality of interworking function configurations based on the relay service code for the determined service.
2. The method of example 1, wherein each of the plurality of interworking function configurations is associated with one or more of the plurality of relay service codes.
3. The method of any of examples 1-2, wherein the plurality of interworking function configurations are received in sidelink policy information.
4. The method of example 3, wherein: the sidelink policy information further includes interworking function configuration selection information; and the selecting the one of the plurality of interworking function configurations is further selected based on the interworking function configuration selection information.
5. The method of example 4, wherein the interworking function configuration selection information includes a prioritized list of preferred public land mobile networks (PLMNs) for interworking function selection.
6. The method of example 5, wherein the interworking function configuration selection information further includes home PLMNs (HPLMN) associated with the PLMNs in the prioritized list of preferred PLMNs.
7. The method of example 6, wherein the plurality of interworking function configurations comprises fully qualified domain names (FQDNs) or Internet Protocol (IP) addresses of the interworking functions in the HPLMN.
8. The method of any of examples 6-7, further comprising deriving fully qualified domain names (FQDNs) or Internet Protocol (IP) addresses of the interworking functions in the HPLMN based on the relay service codes.
9. The method of any of examples 6-8, wherein: the selected interworking function configuration is associated with an interworking function in the HPLMN; and the method further comprises determining an Internet protocol (IP) address of the interworking function in the HPLMN using an identifier configuration of the selected interworking function configuration.
10. The method of any of examples 4-9, wherein the interworking function configuration selection information includes an indication to select an interworking function configuration based on a tracking area identifier (TAI), a location area identifier, or an operator identifier.
11. The method of example 10, further comprising: determining a fully qualified domain names (FQDN) for the selected interworking function configuration using the tracking or location area identifier FQDN of the tracking area in which the remote UE is located; or determining the FQDN for the selected interworking function configuration using the operator identifier of the PLMN associated with the selected interworking function configuration.
12. The method of any of examples 10-11, further comprising receiving an indication from the sidelink relay UE of the TAI corresponding to a location of the sidelink relay UE and the PLMN to which the sidelink relay UE is connected for access to the network.
13. The method of example 12, wherein the indication from the sidelink relay UE is received in a broadcast discovery announcement message, a relay discovery additional information message, or a unicast direct communication accept message.
14. The method of any of examples 6-13, wherein the selecting includes: selecting the interworking function configuration associated with the HPLMN when the remote UE and the sidelink relay UE are located in the same HPLMN; and selecting the interworking function configuration based on the prioritized list of preferred PLMNs when the remote UE and the sidelink relay UE are located in different HPLMNs.
15. The method of any of examples 6-14, wherein the selecting includes: performing a sidelink relay discovery procedure; determining to establish a sidelink unicast link only with relay UEs that are in a PLMN in the prioritized list of preferred PLMNs; and selecting the interworking function configuration associated with one of the sidelink relay UEs.
16. The method of any of examples 1-15, wherein: the network is a 3GPP network; and the plurality of interworking function configurations comprises one or more non-3GPP interworking function configurations.
17. The method of examples 1-16, further comprising accessing the network via an access link or via a sidelink UE-to-network relay access provided by the sidelink relay UE.
18. A method for wireless communication by a sidelink relay user equipment (UE), comprising: receiving one or more interworking function configurations, for providing a remote UE access to a network via a sidelink, and a plurality of relay service codes; providing an indication to the remote UE of a location of the sidelink relay UE; receiving, from the remote UE, data and an identifier of an interworking function associated with one of the one or more interworking function configurations; and forwarding the data to the interworking function based on the identifier.

19. The method of example 18, further comprising sending an indication to the sidelink remote UE of a tracking area identifier (TAI) corresponding to a location of the sidelink relay UE and a public land mobile network (PLMN) to which the sidelink relay UE is connected for access to the network.

20. The method of example 19, wherein the indication from the sidelink relay UE is sent in a broadcast discovery announcement message, a relay discovery additional information message, or a unicast direct communication accept message.

21. The method of any of examples 18-20, wherein: the network is a 3GPP network; and the plurality of interworking function configurations comprises one or more non-3GPP interworking function configurations.

22. The method of any of examples 18-21, wherein the plurality of interworking function configurations comprises fully qualified domain names (FQDNs) or Internet Protocol (IP) addresses of the interworking functions.

23. A method for wireless communication by a network entity, comprising: configuring one or more user equipments (UE) as remote UEs and one or more UEs as sidelink relay UEs; providing the one or more remote UEs and one or more sidelink relay UEs with one or more interworking function configurations, for access by the one or more remote UEs to a network via the one or more sidelink relay UEs, and a plurality of relay service codes; and receiving data from at least one of the one or more remote UEs via at least one of the one or more sidelink relays UE and at least one interworking function associated with one of the one or more interworking function configurations.

24. The method of example 23, wherein each of the plurality of interworking function configurations is associated with one or more of the plurality of relay service codes.

25. The method of any of examples 23-24, wherein the plurality of interworking function configurations are provided in sidelink policy information.

26. The method of example 25, wherein: the sidelink policy information further includes a prioritized list of preferred public land mobile networks (PLMNs) for interworking function selection.

27. The method of example 26, wherein the sidelink policy information further includes home PLMNs (HPLMN) associated with the PLMNs in the prioritized list of preferred PLMNs.

28. The method of any of examples 26-27, wherein the sidelink policy information includes an indication to select an interworking function configuration based on a tracking area identifier (TAI), a location area identifier, or an operator identifier.

29. The method of any of examples 23-28, wherein: the network is a 3GPP network; and the plurality of interworking function configurations comprises one or more non-3GPP interworking function configurations.

30. An apparatus comprising means for performing the method of any of aspects 1 through 22.

31. An apparatus comprising means for performing the method of any of aspects 23 through 29.

32. An apparatus comprising at least one processor and a memory coupled to the at least one processor, the memory comprising code executable by the at least one processor to cause the apparatus to perform the method of any of aspects 1 through 22.

33. An apparatus comprising at least one processor and a memory coupled to the at least one processor, the memory comprising code executable by the at least one processor to cause the apparatus to perform the method of any of aspects 23 through 39.

34. A computer readable medium storing computer executable code thereon for wireless communications that, when executed by at least one processor, cause an apparatus to perform the method of any of aspects 1 through 22.

35. A computer readable medium storing computer executable code thereon for wireless communications that, when executed by at least one processor, cause an apparatus to perform the method of any of aspects 23 through 29.

ADDITIONAL CONSIDERATIONS

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

The invention claimed is:

1. A method for wireless communication by a remote user equipment (UE), the method comprising:
receiving sidelink policy information including a plurality of relay service codes (RSCs) and interworking function (IWF) selection information, the IWF selection information including an indication to select an IWF based on a tracking area identifier (TAI) or an operator identifier;
receiving an indication, from a sidelink relay UE, of the TAI corresponding to a location of the sidelink relay UE;
receiving an indication of a public land mobile network (PLMN) associated with the sidelink relay UE; and
selecting an IWF, for accessing a network via the sidelink relay UE, based on at least one of the plurality of RSCs for at least one service and on the IWF selection information.

2. The method of claim 1, wherein the IWF is associated with the least one of the plurality of RSCs.

3. The method of claim 1, wherein the IWF selection information includes a prioritized list of preferred PLMNs for IWF selection.

4. The method of claim 3, wherein the IWF selection information further includes home PLMNs (HPLMNs) associated with the PLMNs in the prioritized list of preferred PLMNs.

5. The method of claim 4, wherein the IWF selection information comprises fully qualified domain names (FQDNs) or Internet Protocol (IP) addresses of one or more IWFs in the HPLMN.

6. The method of claim 4, further comprising deriving fully qualified domain names (FQDNs) or Internet Protocol (IP) addresses of the IWF.

7. The method of claim 4, wherein:
the selected IWF is associated with an IWF in the HPLMN; and
the method further comprises determining an Internet protocol (IP) address of the IWF in the HPLMN using an identifier configuration of the selected IWF.

8. The method of claim 1, further comprising determining a fully qualified domain names (FQDN) for the selected IWF using the TAI of a tracking area in which the remote UE is located or the operator identifier of the PLMN associated with the selected IWF.

9. The method of claim 1, wherein the indication from the sidelink relay UE is received in a relay discovery additional information message.

10. The method of claim 4, wherein the selecting includes:
selecting the IWF associated with the HPLMN when the remote UE and the sidelink relay UE are located in the same HPLMN; and
selecting the IWF based on the prioritized list of preferred PLMNs when the remote UE and the sidelink relay UE are located in different HPLMNs.

11. The method of claim 4, wherein the selecting includes:
performing a sidelink relay discovery procedure;
determining to establish a sidelink unicast link only with relay UEs that are in a PLMN in the prioritized list of preferred PLMNs; and
selecting the IWF associated with one of the sidelink relay UEs.

12. The method of claim 1, wherein:
the network is a 3GPP network; and
the selected IWF is a non-3GPP IWF.

13. The method of claim 1, further comprising accessing the network via an access link or via a sidelink UE-to-network relay access provided by the sidelink relay UE.

14. A method for wireless communication by a sidelink relay user equipment (UE), the method comprising:
receiving a plurality of relay service codes (RSCs);
providing an indication to a remote UE of a tracking area identifier (TAI) corresponding to a location of the sidelink relay UE;
receiving, from the remote UE via a sidelink, data and an identifier of an interworking function (IWF); and
forwarding the data to a network via the IWF based on the identifier.

15. The method of claim 14, wherein the indication is provided in a relay discovery additional information message.

16. The method of claim 14, wherein:
the network is a 3GPP network; and
the IWF comprises a non-3GPP IWF.

17. The method of claim 14, wherein the IWF is associated with a fully qualified domain name (FQDN) or Internet Protocol (IP) address.

18. An apparatus for wireless communication, the apparatus comprising:
a receiver configured to receive sidelink policy information including a plurality of relay service codes (RSCs), interworking function (IWF) selection information, the IWF selection information including an indication to select an IWF based on a tracking area identifier (TAI) or an operator identifier;
a memory comprising computer executable code executable; and
at least one processor configured to execute the computer executable code to cause the apparatus to:
receive an indication from a sidelink relay UE, of the TAI corresponding to a location of the sidelink relay UE;
receive an indication of a public land mobile network (PLMN) associated with the sidelink relay UE; and
select an IWF, for accessing a network via the sidelink relay UE, from based on at least one of the plurality of RSCs for at least one service and on the IWF selection information.

* * * * *